United States Patent [19]
Shieh

[11] Patent Number: 5,764,222
[45] Date of Patent: Jun. 9, 1998

[54] VIRTUAL POINTING DEVICE FOR TOUCHSCREENS

[75] Inventor: Johnny Meng-Han Shieh, Austin, Tex.

[73] Assignee: International Business Machines Corporation, Armonk, N.Y.

[21] Appl. No.: 654,486

[22] Filed: May 28, 1996

[51] Int. Cl.⁶ .................. G09G 5/00; G09G 5/08
[52] U.S. Cl. .............. 345/173; 345/157; 345/145; 345/333; 382/124
[58] Field of Search .................. 345/173–179, 345/156–157, 162, 145, 189; 395/333–335, 348, 339, 156; 382/124, 125

[56] References Cited

U.S. PATENT DOCUMENTS

| | | | |
|---|---|---|---|
| 4,903,012 | 2/1990 | Ohuchi | 345/178 |
| 4,914,624 | 4/1990 | Dunthorn . | |
| 5,319,747 | 6/1994 | Gerrissen et al. . | |
| 5,327,161 | 7/1994 | Logan et al. . | |
| 5,335,557 | 8/1994 | Yasutake . | |
| 5,376,946 | 12/1994 | Mikan . | |
| 5,420,936 | 5/1995 | Fitzpatrick et al. | 345/173 |
| 5,428,367 | 6/1995 | Mikan . | |
| 5,493,621 | 2/1996 | Matsumura | 382/125 |
| 5,515,081 | 5/1996 | Vasilik | 345/189 |
| 5,546,523 | 8/1996 | Gatto | 395/156 |
| 5,612,719 | 3/1997 | Beernink et al. | 345/179 |
| 5,621,438 | 4/1997 | Kamimura et al. | 345/178 |

FOREIGN PATENT DOCUMENTS

| | | |
|---|---|---|
| 02127720 | 5/1990 | European Pat. Off. . |
| 0546704A | 6/1993 | European Pat. Off. . |
| 0725331A1 | 8/1996 | European Pat. Off. . |
| WO 92/09944 | 6/1992 | WIPO . |

OTHER PUBLICATIONS

IBM Technical Disclosure Bulletin vol. 33, No. 7, "Mouse Emulation for Digitizer/Touch Panel," Dec. 1990.
IBM Technical Disclosure Bulletin vol. 36, No. 11, "Soft Adaptive Follow–Finger Keyboard for Touch Screen Pads," Nov. 1993.
"TOUCH and GO", article, Austin American–Statesman Newspaper, dated Apr. 8, 1996, pp. D and D2.

*Primary Examiner*—Steven J. Saras
*Assistant Examiner*—David L. Lewis
*Attorney, Agent, or Firm*—Richard A. Henkler; Andrew J. Dillon

[57] ABSTRACT

A method, apparatus, and article of manufacture direct a computer system, having at least a processor, memory, and touchscreen, to create a virtual pointing device on the touchscreen. The method includes the steps of measuring at least a first portion of a hand placed on the touchscreen, determining if at least one measurement of the first portion substantially matches any existing measurements stored in the memory, if a substantial match exists, reading the memory for pre-defined characteristics, and building a virtual pointing device on the touchscreen in accordance with the pre-defined characteristics.

19 Claims, 9 Drawing Sheets

VIRTUAL POINTING DEVICE FOR TOUCHSCREENS

CROSS-REFERENCE TO RELATED APPLICATIONS

The present invention appears to claim subject matter disclosed in prior co-pending application, Ser. No. 08/654,484, IBM Docket No. AT9-96-017, filed on May 28, 1996, and co-pending application, Ser. No. 08/654,487, IBM Docket No. AT9-96-066, filed on May 28, 1996.

BACKGROUND OF THE INVENTION

1. Field of the Invention

The present invention relates to pointing devices and pointers and, more particularly, but without limitation, to pointing devices for use on touchscreen systems.

2. Background Information and Description of the Related Art

Conventionally, users interface with the desktop and operating system of their computer system using a "mouse". A mouse is a special hardware input device connected by a wire or infrared signal to the computer system. Typically, the mouse has one or more push buttons on its top and a roller on its bottom designed to roll along a surface next to the computer system. When the user moves the mouse's roller on the surface, a mouse pointer positioned on the computer system's display tracks the movement of the mouse's roller. When the user has positioned the pointer at a desirable location, such as over an object, the user clicks or multiple clicks, depending on how the mouse is programmed, one of the mouse push buttons to invoke or open the object.

The user may customize the operations of a mouse and mouse pointer. Through a customization menu maintained by some conventional operating systems, the user may customize, for example, the assignment of a single click of a first mouse button to invoke a first function and the assignment of a single click over a second mouse button to invoke a second function. Further, the user may customize the appearance of the mouse pointer on the display screen. For example, one user may prefer a small arrow to be the mouse pointer, while another user may prefer a large blinking arrow. Similarly, some users may prefer a fast mouse pointer (i.e., small movements of the mouse's roller cause large movement of the mouse pointer), while other users may prefer a slower mouse pointer. This feature is referred to as the "sensitivity" of the mouse pointer.

These types of mouse and mouse pointer behaviors may be customized for each individual user. However, most operating systems provide customization for only one user on one system. Therefore, for a multi-user system, the user must re-customize the mouse from the prior setting. This typically involves the user editing a mouse settings file or local database that maps button behavior to a specific function. Some systems, such as X11, have a special init file to do this.

Conventional mice suffer certain disadvantages and limitations. For example, the mouse is bulky, fixed in size so that very small hands or very large hands alike do not properly fit over the mouse, not permanently attached to the computer system, subject to corrosion, and requires the user to know the specific mouse behavior (e.g., which mouse button and how many clicks invoke a function). Accordingly, many customer oriented systems (e.g., ATM machines) and multi-user systems do not use mice. Rather, the trend for multi-user systems is to use touchscreens.

Conventional touchscreens allow the user's finger or a pointing device to replace the conventional mouse and mouse pointer. Conventional touchscreens utilize, for example, heat sensitive, sound sensitive, pressure sensitive, or motion sensitive grids/detectors to detect a hand, finger, or object placed on the touchscreen. However, conventional touchscreens suffer certain limitations and disadvantages. For example, unlike a mouse pointer, fingers vary in size and, therefore, the desktop must place contiguous object icons and text far apart to accommodate the largest fingers. Also, the user cannot select the customization features as found in conventional mice and mouse pointers.

Accordingly, there would be great demand for a new pointing device that uses touchscreen technology, but allows object icons and text to be placed close to one another and allows user customization of the pointing device and pointer.

SUMMARY

Accordingly, it is an object of the present invention to provide a method, apparatus, and article of manufacture that direct a computer system, having at least a processor, memory, and touchscreen, to create a virtual pointing device on the touchscreen. The method includes the steps of measuring at least a first portion of a hand (e.g., the palm and fingers) placed on the touchscreen, determining if at least one measurement of the first portion substantially matches any existing measurements stored in the memory, if a substantial match exists, reading the memory for pre-defined characteristics, and building a virtual pointing device on the touchscreen in accordance with the pre-defined characteristics.

DETAILED DESCRIPTION OF THE PREFERRED EMBODIMENTS

Figure 1:
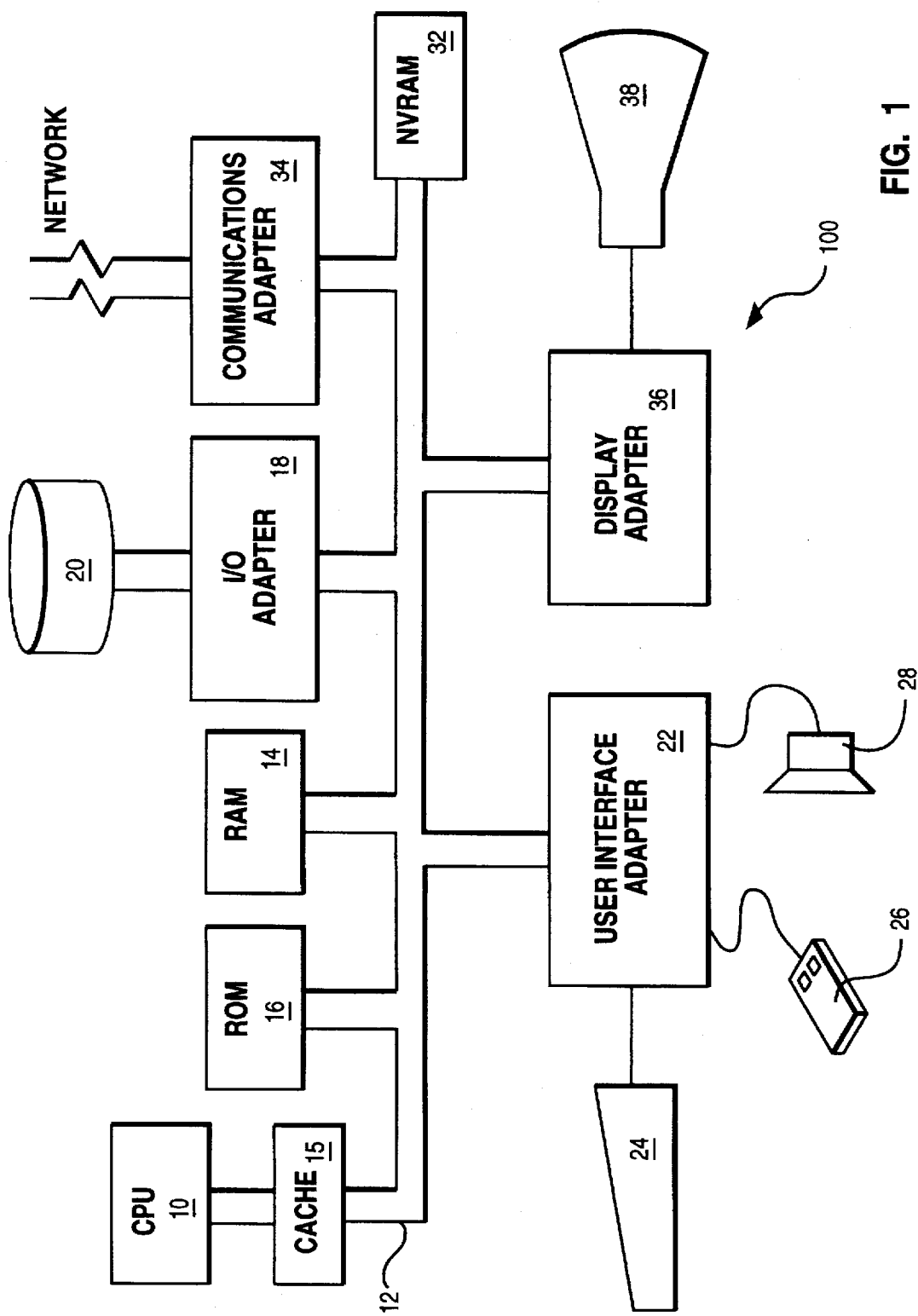
FIG. 1 illustrates a conventional hardware configuration for use with the present invention.

The preferred embodiments may be practiced in any suitable hardware configuration that uses a touchscreen, such as computing system 100 illustrated in FIG. 1 or, alternatively, in a laptop or notepad computing system. Computing system 100 includes any suitable central processing unit 10, such as a standard microprocessor, and any number of other objects interconnected via system bus 12. For purposes of illustration, computing system 100 includes memory, such as read only memory (ROM) 16, random access memory (RAM) 14, and peripheral memory devices (e.g., disk or tape drives 20) connected to system bus 12 via I/O adapter 18. Computing system 100 further includes a touchscreen display adapter 36 for connecting system bus 12 to a conventional touchscreen display device 38. Also, user interface adapter 22 could connect system bus 12 to other user controls, such as keyboard 24, speaker 28, mouse 26, and a touchpad 32 (not shown).

One skilled in the art readily recognizes how conventional touchscreens operate, how conventional touchscreen device drivers communicate with an operating system, and how a user conventionally utilizes a touchscreen to initiate the manipulation of objects in a graphical user interface. For example, a user can initiate the display of a pull down menu by touching the touchscreen, and then selecting an object within that menu by dragging the finger down the pull down menu.

A graphical user interface (GUI) and operating system (OS) of the preferred embodiment reside within a computer-readable media and contain a touchscreen device driver that allows one or more users a user to initiate the manipulation of displayed object icons and text on a touchscreen display device. Any suitable computer-readable media may retain the GUI and operating system, such as ROM 16, RAM 14, disk and/or tape drive 20 (e.g., magnetic diskette, magnetic tape, CD-ROM, optical disk, or other suitable storage media).

In the preferred embodiments, the COSE™ (Common Operating System Environment) desktop GUI interfaces the user to the AIX™ operating system. The GUI may be viewed as being incorporated and embedded within the operating system. Alternatively, any suitable operating system or desktop environment could be utilized. Examples of other GUIs and/or operating systems include X11™ (X Windows) graphical user interface, Sun's Solaris™ operating system, and Microsoft's Windows 95™ operating system. While the GUI and operating system merely instruct and direct CPU 10, for ease in explanation, the GUI and operating system will be described as performing the following features and functions.

Figure 2:
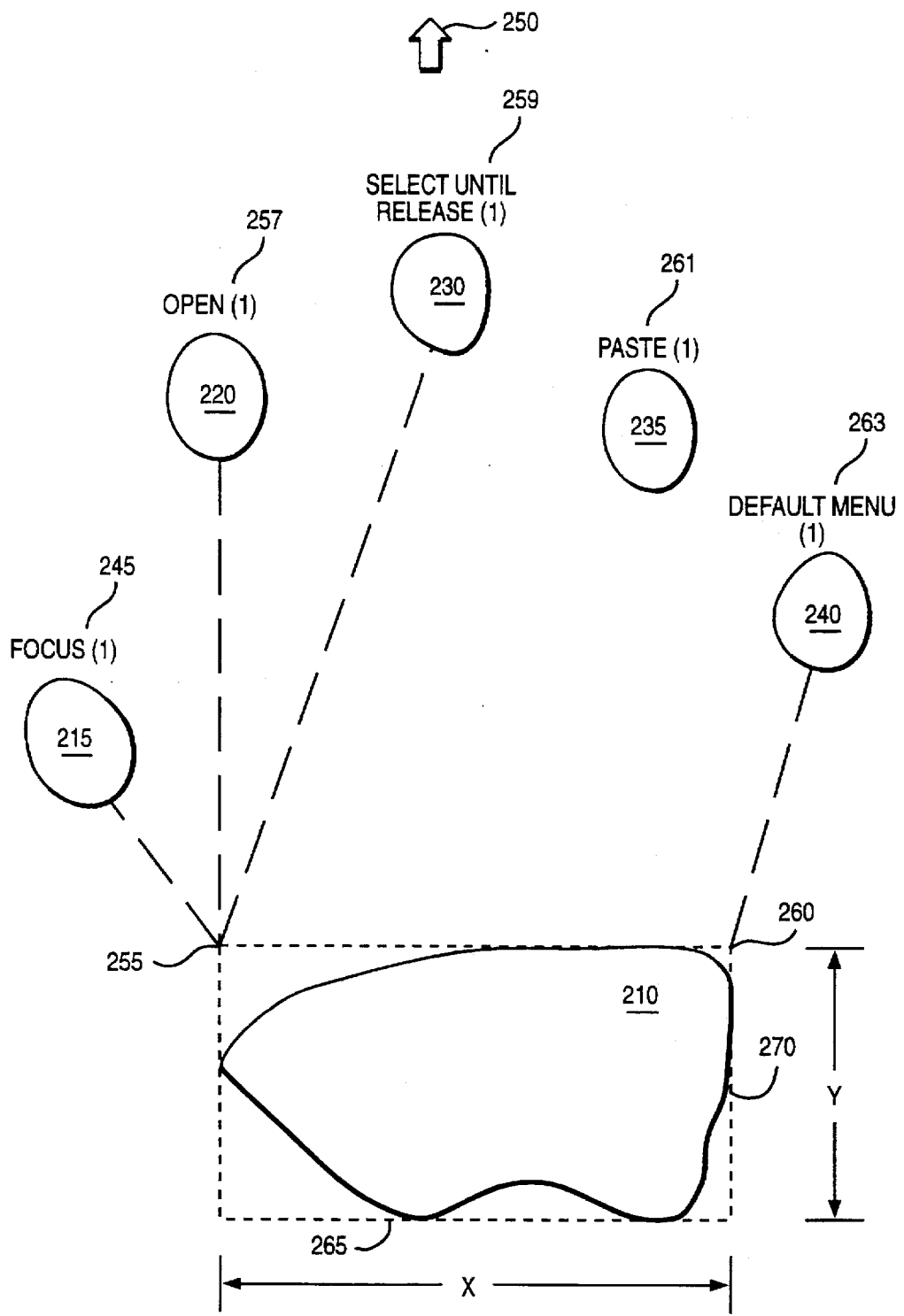
FIG. 2 illustrates a virtual pointing device in accordance with the present invention.

Referring to FIG. 2, touchscreen 200 includes any conventional, suitable touchscreen that is sensitive to, for example, heat, pressure, or the sound of palm and fingerprints. In this illustration, a user has placed his/her right hand (not shown) on touchscreen 200. While any suitable touchscreen technology may be used, for ease in explanation, the preferred embodiment will be described as using a touchscreen that detects sound patterns. In response to the user placing his/her hand on touchscreen 200, touchscreen 200 detects the sound pattern of the user's hand, including the sound from palmprint area 210, thumbprint area 215, and fingerprint areas 220, 230, 235, and 240. Alternatively, only a portion of the hand (e.g., only fingers) and/or a unique object could be substituted for the detection of a hand print. Moreover, more than one hand or object can be detected at a time.

When touchscreen 200 detects one or more hand/finger patterns similar to the one shown in FIG. 2, the OS attempts to identify the user(s). To do so, the OS measures the distance of each fingerprint area 215, 220, 230 and 240 from palmprint area 210, along with the X, Y coordinates of palmprint area 210 and the X, Y extremities of the palmprint area 210. The OS defines the cross point of the leftmost and uppermost point as the first reference point 255. The OS measures the shortest distance from thumbprint 215 to the first reference point 255. Similarly, the OS measures the shortest distance from fingerprint areas 220 and 230, respectively, to first reference point 255.

In the same manner, the OS defines the cross point of the rightmost and uppermost point as the second reference point 260, whereby the shortest distance from fingerprint area 240 to the second reference point 260 is determined. Finally, the OS measures the X and Y coordinates 265 and 270 of palmprint area 210. To add even more accuracy, the size of each fingerprint could be measured.

Next, the OS searches a user file database (not shown) stored in memory for a match of the newly determined measurements with any existing measurements to determine if a stored identity exists for the handprint. Specifically, the OS compares the four distance measurements and the X, Y coordinates of palmprint 210 with any existing measurements stored in the user file database. However, one skilled in the art realizes that numerous means exists for identifying the handprint (or object print) of a particular user (or user's object) without departing from the scope and spirit of this invention. Illustratively, only the width of the palmprint area 210 could be used to determine if a match existed.

If the OS finds a match within a user-defined (or default) acceptable tolerance (described herein), the OS reads the user file for pre-defined customization features, if any, and creates a virtual pointing device under the hand (or a portion of the hand) positioned on touchscreen 200 using the pre-defined customization features. Therefore, the areas of touchscreen 200 under, for example, the user's thumb (i.e., thumbprint area 215), fingers (i.e., fingerprint areas 220, 230, 235, and 240), and palm (i.e., palmprint area 210) become "activated", such that certain defined movements of the user's fingers, thumb, and/or palm over those "activated" areas cause certain functions to be invoked. However, if the OS does not recognize the handprint, the OS builds a default virtual pointing device under the hand or a portion of the hand using a default set of functions.

Figure 5:
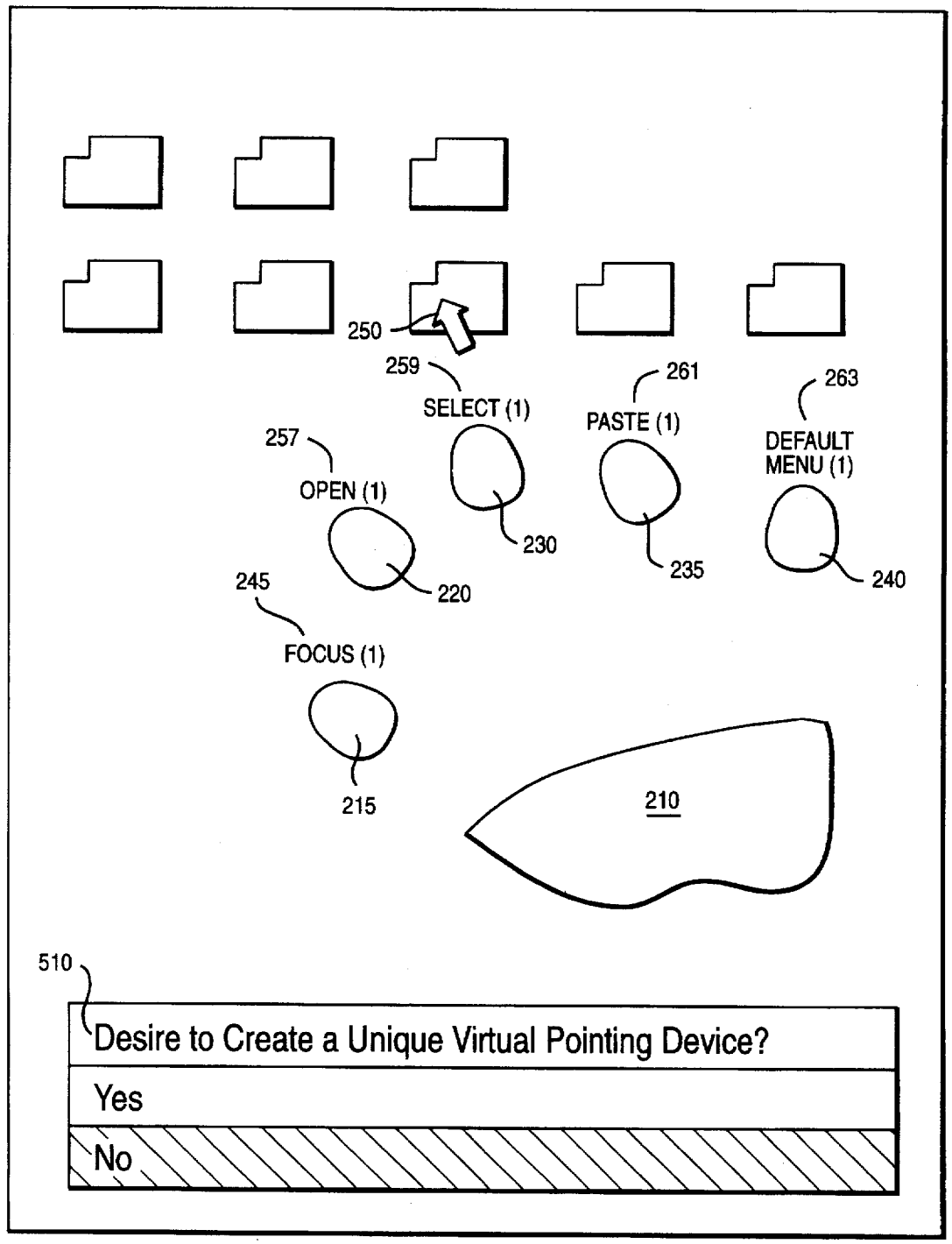
FIG. 5 illustrates another view of the virtual pointing device shown in FIG. 2.

FIG. 5 illustrates how the user(s) move and operate the virtual pointing device(s). As the user slides his/her hand over touchscreen 200 such that the hand remains in substantial contact with touchscreen 200, the OS detects the position of the user's moving hand on touchscreen 200 and, in response, continuously re-defines the "activated" areas of the virtual pointing device to be the areas under the hand (or a portion of the hand). Therefore, the virtual pointing device moves with and according to the movement of the user's hand. For example, if an "activated" area is initially defined as the area contained within the touchscreen pixel coordinates [X1, Y1, X2, Y2, X3, Y3, and X4, Y4] (not shown) and the user moves a finger from that area to the touchscreen pixel coordinates [X5, Y5, X6, Y6, X7, Y7, and X8, Y8], the "activated" area moves to those new coordinates.

The OS positions pointer 250 near the virtual pointing device (in this case, over fingerprint area 230) such that pointer 250 moves in lock step with the virtual pointing device. Therefore, the user could, for example, move the virtual pointing device and, therefore, pointer 250, such that pointer 250 is positioned over a desired object icon. Alternatively, the user could merely lift his hand and place it at a desired location, whereby the OS would re-create the virtual pointing device under the user's hand at the new location (described herein).

The user operates the virtual pointing device via movement of the user's fingers, thumb and/or palm. Illustratively, the user may invoke the "focus function" 245, whereby an object icon positioned under pointer 250 gains focus, by lifting his/her thumb and then placing the thumb back on thumbprint area 215 (referred to as "single clicking"). Similarly, the user may invoke the "paste" function by lifting and replacing his/her third finger on third fingerprint area 235.

Each finger, palm, and thumb behavior and associated functionality can be specially programmed, and later reprogrammed, to invoke a specific function (described in more detail herein). The OS displays a dialog above each fingerprint/thumbprint area to indicate the finger behavior (a "(1)" representing a single click; a "(2)" representing a double click, etc.) and corresponding functionality (e.g., focus 245, open 257, select until release 259, paste 261 and default menu 262).

The default functionality, finger behavior and pointer are defined in the preferred embodiment as follows. A single click of the thumb on thumbprint area 215 causes the OS to invoke focus function 245 on any object icon or text positioned under pointer 250. A single click of a finger on fingerprint area 220 causes the OS to invoke an open function 230 on any object icon or text positioned under pointer 250. A single click on fingerprint area 230 invokes a select until release function 259 on any object icon or text positioned under pointer 250, while a single click of fingerprint area 235 invokes a paste function 261 on any object icon or text positioned under pointer 250. Finally, a single click of fingerprint area 240 invokes a default menu function 263. The default pointer 250 is in the shape of an arrow and is positioned near fingerprint area 230. However, one skilled in the art readily recognizes that any combination of default functions, pointer location, and/or finger behavior (e.g., multiple clicks) could have been used to define the default virtual pointing device.

Figure 3:
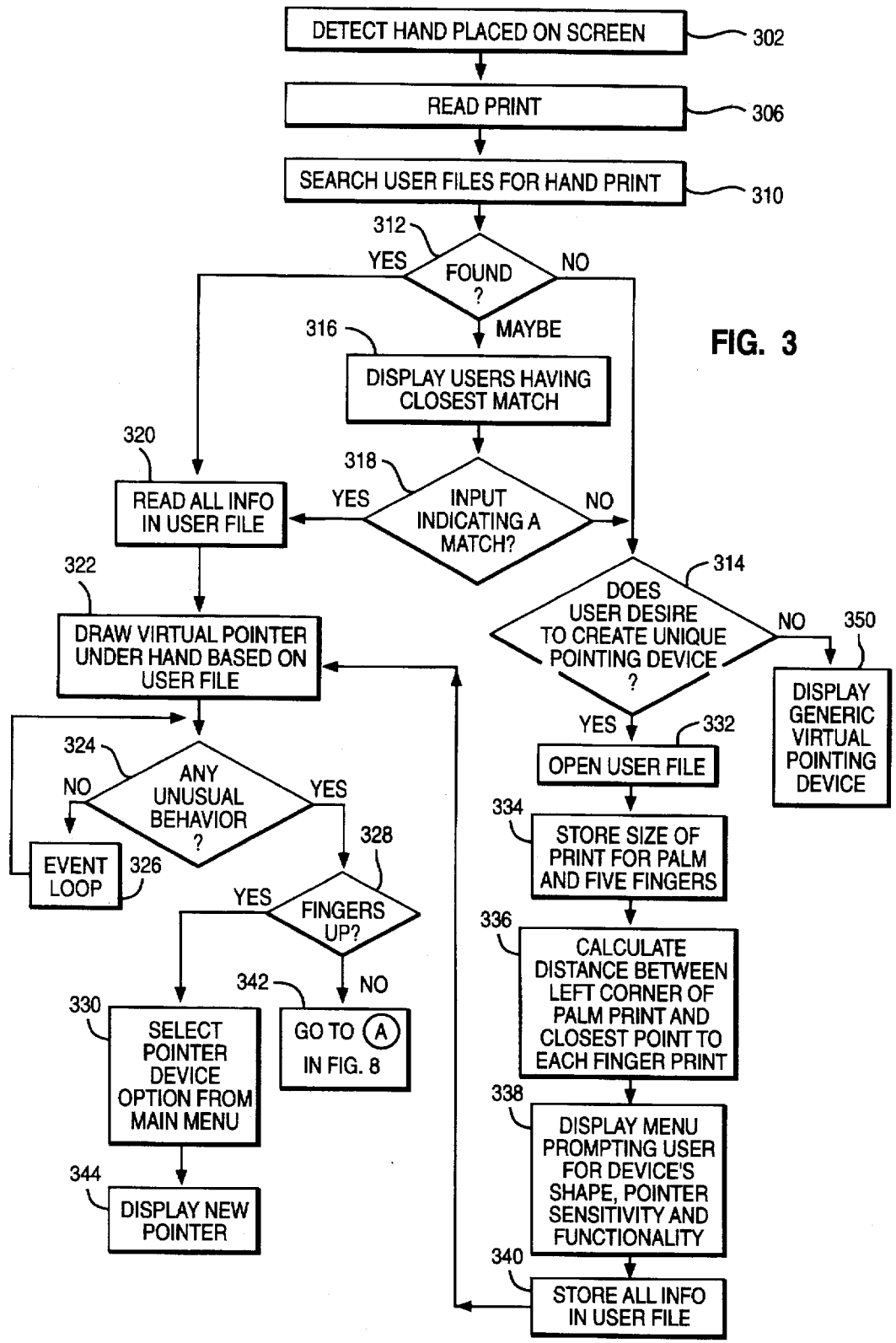
FIG. 3 illustrates detailed logic in the form of a flowchart for performing the steps in accordance with the present invention.

FIG. 3 illustrates a flow chart containing detailed logic for implementing the preferred embodiments. At 302, touchscreen 200 detects sound/heat/pressure, etc., from a handprint (or object), or alternatively, a portion of a handprint. At 306, the OS reads the handprint and calculates the measurements previously described and illustrated in FIG. 2. At 310, the OS searches user files in a database for the handprint measurements. At 312, if the OS locates any existing handprint measurements within a default tolerance of 10% (which can later be changed by the user, described herein), at 320, OS reads all information in that user file and, at 322, draws a virtual pointing device under the user's hand (or portion of the hand) based on pre-defined characteristics found in the user file.

Figure 9:
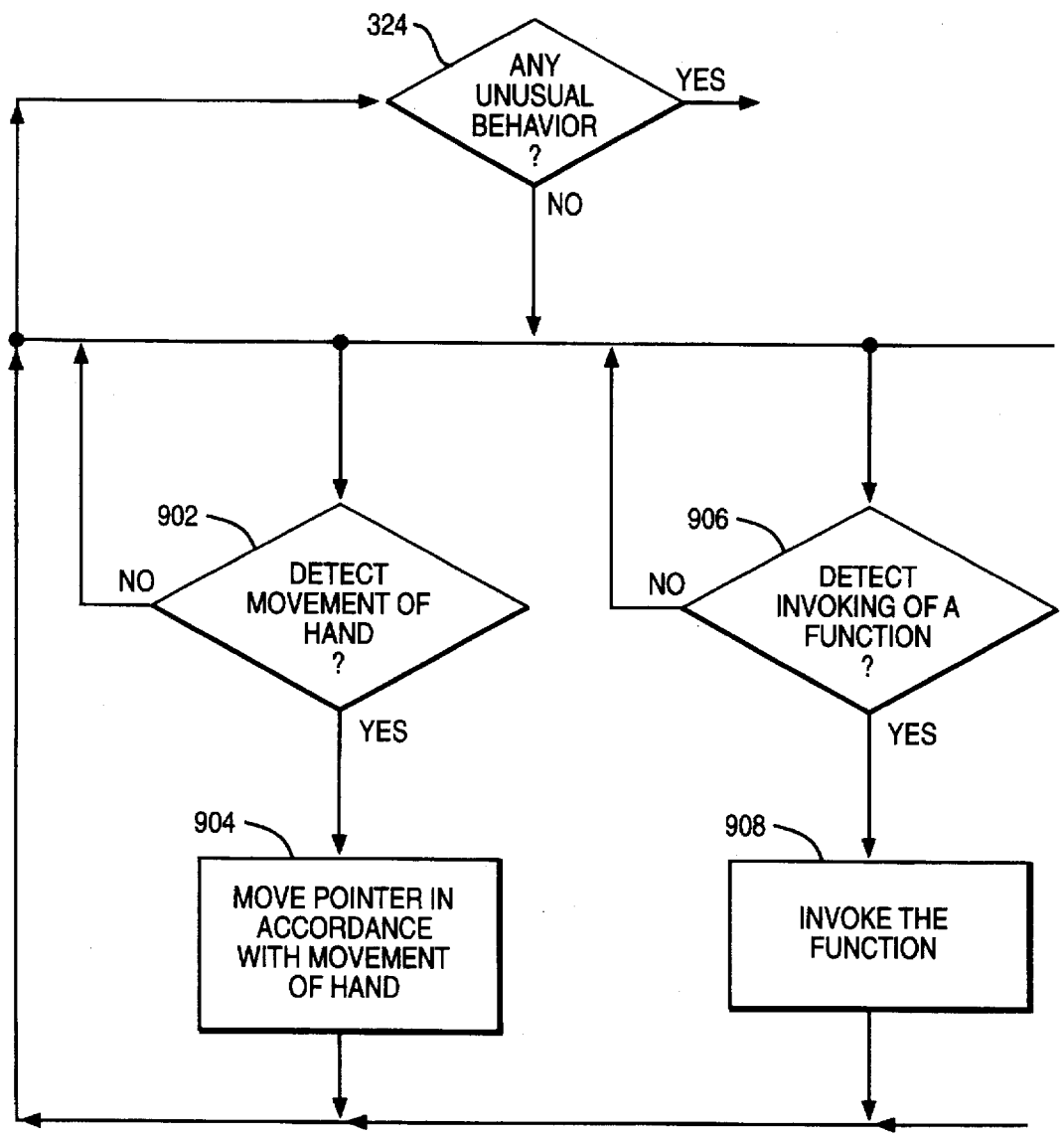
FIG. 9 illustrates detailed logic in the form of a flowchart for performing the steps in accordance with the present invention.

At 324, the OS determines if there is any consistent unusual behavior for four or more seconds, such as, for example, failing to detect the fingerprint(s), the palmprint, or no handprint. If the OS detects no unusual behavior, the OS performs a work event loop at 326 (see FIG. 9) and control returns to 324. Referring to FIG. 9, at 902, the OS determines if any movement of the hand across the touchscreen has occurred and, if so, at 904 the OS moves the virtual pointing device in accordance with the movement of the hand. At 906, the OS determines if movement of a finger or thumb has occurred to invoke a function and, if so, at 908 the OS invokes that function. Control returns to 324.

Returning to 324 of FIG. 3, if the OS detects unusual behavior for a certain amount of time (e.g., 4 seconds), at 328, the OS determines if all fingers have been lifted off the touchscreen while the palm remains on the touchscreen. Alternatively, one skilled in the art recognizes that many other indicators could replace the "all fingers lifted" indicator, such as determining if a combination of fingers have been lifted or determining if the palm has been lifted while the fingerprints remain in contact with the touchscreen. If the OS determines that all fingers have been lifted off the touchscreen, at 330, the OS displays a main menu 600 (see FIG. 6, described herein) prompting the user to provide any customization of the virtual pointing device. At 344, the OS displays the new virtual pointing device in accordance with any changes made at 330.

Figure 8:
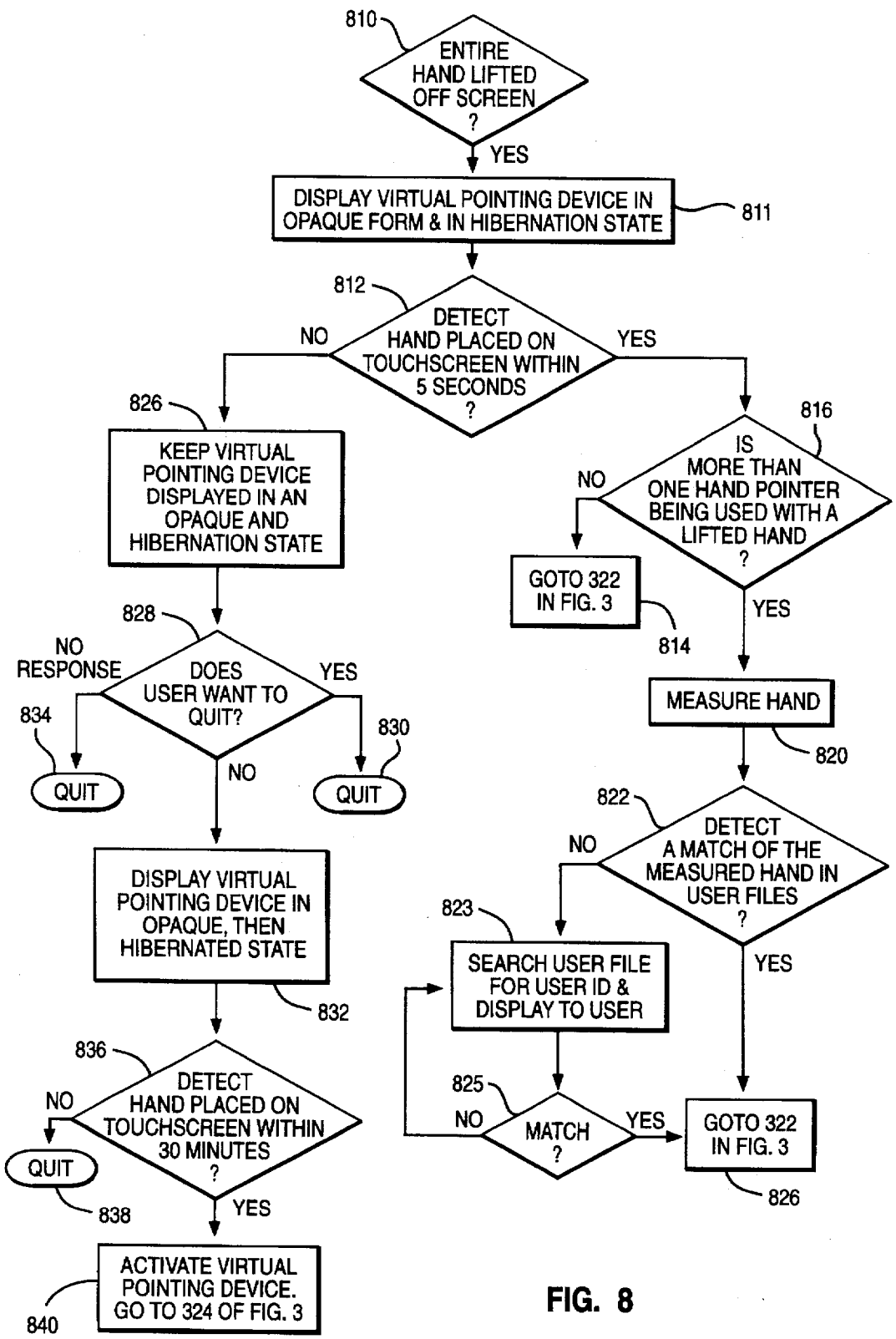
FIG. 8 illustrates detailed logic in the form of a flowchart for performing the steps in accordance with the present invention.

Returning to 328, if the fingers were not detected as being raised while the palm remained in contact with the touchscreen, at 342, control is directed to FIG. 8. Referring to FIG. 8, at 810, the OS determines if the entire hand (or object) has been lifted off the touchscreen. If the entire hand has been lifted, at 811, the OS continues to display the virtual pointing device on the touchscreen in its current location for a period of time (e.g., 5 seconds) but an obvious hibernated state, meaning the fingerprint and palmprint areas will be viewed as translucent areas on the touchscreen. At 812, the OS determines if the hand has been re-positioned on the touchscreen within five seconds of detecting its removal. If the hand has not been re-positioned on the touchscreen within the five seconds, control is directed to 826 (described herein). However, if the OS detects the hand being re-positioned on the touchscreen within 5 seconds, at 816, the OS determines if more than one virtual pointing device is concurrently being used and, if so, if more than one user is currently lifting his/her hand off the touchscreen. If not, control is directed to 322 of FIG. 3, whereby the OS activates and moves the virtual pointing identified by the user file under the re-positioned hand. If more than one user is concurrently lifting his/her hand off the touchscreen, at 820, the OS reads the handprint and calculates the measurements previously described and illustrated in FIG. 2. At 822, the OS searches the user files of the virtual pointing devices having a detected lifted hand for a hand measurement match. At 823, if a match is not found, the OS searches the user file database for the user identification of one of the virtual pointing devices having a detected lifted hand. The OS then displays a dialog (not shown) asking the user if he/she is the user identified by the user identification. If so, at 826, control is directed to 322 of FIG. 3, whereby the OS moves the virtual pointing device identified by the user file under the re-positioned hand. However, if the user identification does not identify the user at 825, control returns to 823 where the OS searches the next user file of a virtual pointing device having a detected lifted hand. This process repeats until a match is found between the user and the user identification and, therefore, the corresponding virtual pointing device.

Returning to 812, if the hand has not been repositioned on the touchscreen within 5 seconds, at 826, the OS continues to display the virtual pointing device in the obvious and hibernated state and, at 828, prompts the user in a dialog (not shown) if the user desires to quit. If the user desires to quit, control is directed to 830 where the OS removes the virtual pointing device from the display. If the user does not desire to quit, at 832, the OS places the mouse in a "hidden hibernation", which means that the mouse image displayed on the touchscreen will begin to fade with time, but can be instantly activated when the user next touches the touchscreen. Therefore, the OS transforms the virtual pointing device from obvious hibernation (e.g., displayed in an translucent form) to a hidden hibernation. After a user specified time (e.g., 30 minutes), the OS interprets the time delay as meaning that the virtual pointing device is no longer needed. At 836, if the OS detects a hand placed on the touchscreen within 30 minutes, at 840, the OS brings the virtual pointing device out of hidden hibernation, redraws it under the hand, and control returns to 324 of FIG. 3.

Returning to 312 of FIG. 3, the OS determines if a match has been found between a measured hand placed on the touchscreen and any existing user files. If the OS detects several user files having handprint measurements closely matching the handprint in question, at 316, the OS displays in a drop down menu (not shown) on the touchscreen showing those users having the closest match. At 318, the OS waits for the user to select (using his other hand) from the drop down menu a match in user identity, or a selection indicating that no match has occurred. If a match has occurred, control is directed to 320 (previously described). If no match has occurred, control is directed to 314, where the OS displays on the touchscreen a menu (see 510 in FIG. 5) asking the user to indicate if he/she desires to create a customized virtual pointing device. If the user does not desire to create a customized virtual pointing device, the OS prompts the user to place his/her hand on the touchscreen and, in response, the OS builds a generic virtual pointing device under the user's hand, as shown in FIG. 5, having the default finger/palm behavior and fingerprint functionality as previously described.

If the user does desire to create a customized virtual pointing device, at 332, the OS opens a user file. At 334, the OS stores the size of the fingerprints and palmprint in the user file. At 336, the OS calculates the distance between the first reference point (previously described and shown in FIG. 2) and the closest point to each fingerprint of the first three fingers. Additionally, the OS could calculate the second reference point and distance therefrom to the fourth fingerprint. At 338, the OS prompts the user for a user identification, virtual pointing device characteristics, such as the virtual pointing device shape, pointer location, behavior and sensitivity, and fingerprint functionality (described herein and shown in FIG. 6). At 340, the OS stores all information in the user file. Control is directed to 322, where the OS draws the virtual pointing device under the hand (or portion of the hand) based on the information stored in the user file.

Figure 6:
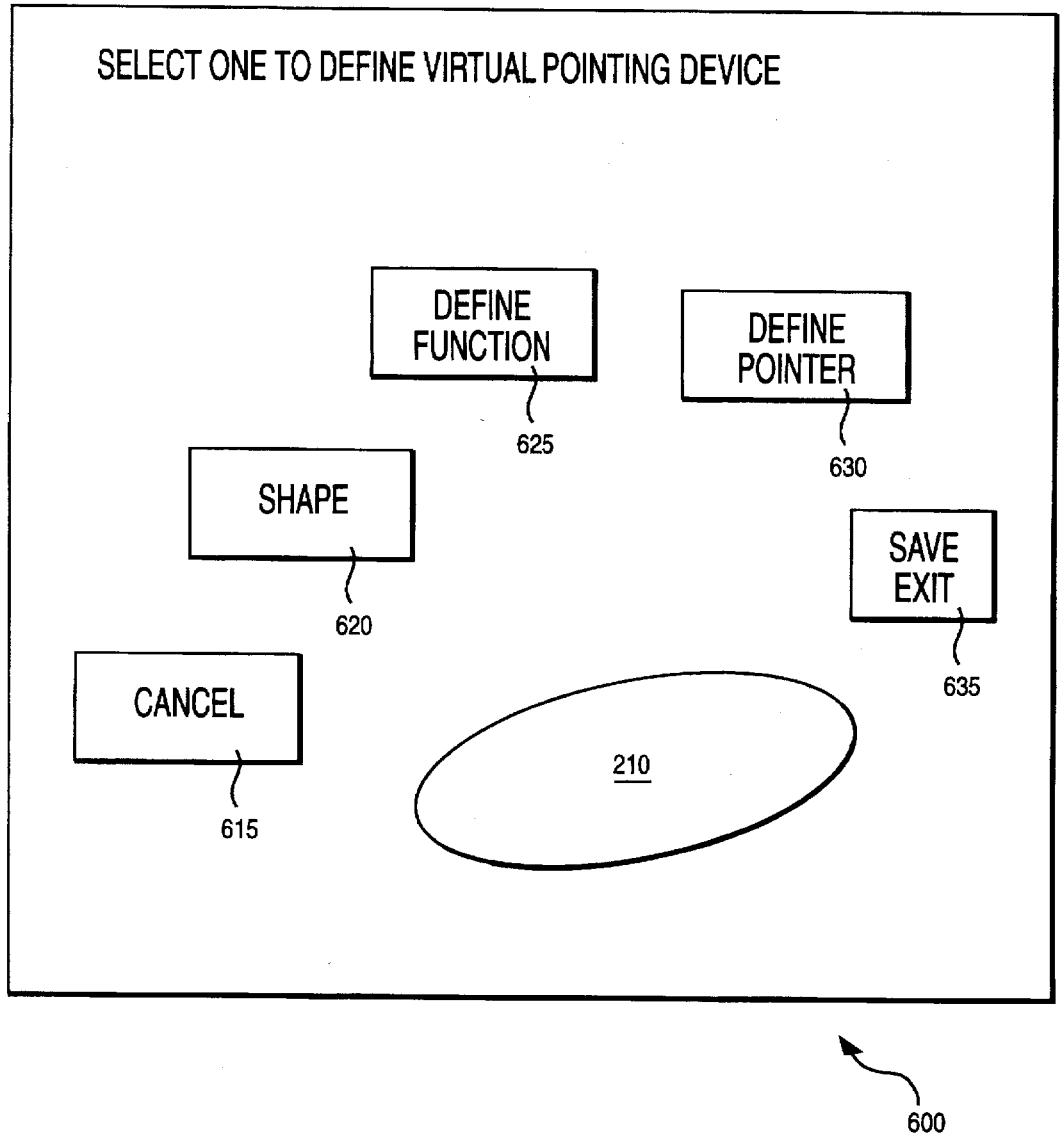
FIG. 6 illustrates a menu for defining the characteristics of the virtual pointing device in accordance with the present invention.

Returning to 328, the OS has detected unusual behavior of a hand on the virtual pointing device. If the OS determines that all fingers of the hand have been lifted off the touchscreen, at 330, the OS displays a main menu 600 as illustrated in FIG. 6, prompting the user to provide any customization of the virtual pointing device. Referring to FIG. 6, after the OS displays the main menu 600, the user may remove his/her hand from the touchscreen.

Figure 7:
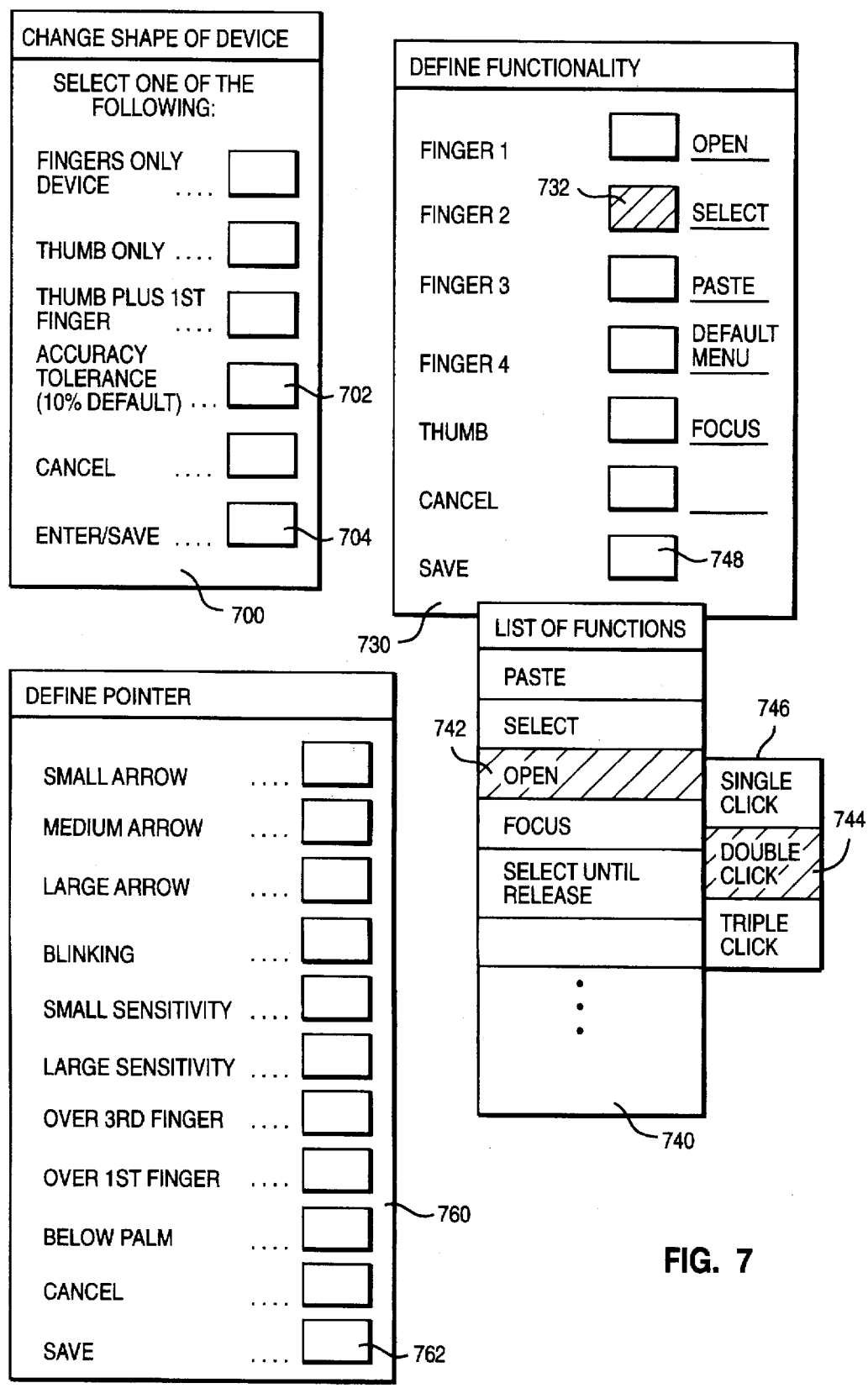
FIG. 7 illustrates a shape menu, define functionality menu, and define pointer menu in accordance with the present invention.

If the user selects shape button 620, a "shape" menu appears (see 700 in FIG. 7) that allows the user to define/redefine the shape of the virtual pointing device. Referring to shape menu 700 of FIG. 7, the OS displays several options to the user. For example, the user could select a "fingers only" virtual pointing device (see FIG. 4, described herein) whereby only the fingers need to be in contact with the touchscreen to move the virtual pointing device, or a palm and thumb only virtual pointing device, whereby only the thumb and palm need to be in contact with the touchscreen to move the virtual pointing device. In the latter case, movement of the fingers would not be assigned functionality. Additionally, "a thumb plus one finger" or "palm" virtual pointing device could be created. However, because the OS invokes the main menu 600 (see FIG. 6) by lifting all fingers while keeping the palm in contact with the touchscreen, if the user defines a new virtual pointing device that does not include the palm, the user could not later re-program the functionality of that special virtual pointing device. Rather, the user would have to start with a generic virtual pointing device to create a new device. Alternatively, a different technique could be used to activate the main menu 600 without departing from the scope of the invention.

The user may change the default accuracy tolerance amount from 10% to one of a number of pre-programmed values. To do so, the user presses accuracy button 702 and, in response, a drop-down list (not shown) of values (e.g., 4%, 8%, 20%) appears for the user's selection. The user enters/saves all selections by pressing button 704. In response, the main menu 600 shown in FIG. 6 reappears.

Returning to FIG. 6, if the user selects define function button 625, a "define function" menu appears that allows the user to define/redefine the functionality of the fingerprints/palmprint areas. Specifically, define functionality menu 730 in FIG. 7 allows the user to change the functionality of each fingerprint and thumbprint area by pressing the associated button next to the appropriate finger. For example, the user has pressed button 732, indicating that he/she desires to change the functionality of the second finger (i.e., fingerprint area 230). In response, the OS displays drop-down list 740 of pre-defined functions stored in memory. The user has selected open function 742 where, in response, the OS displays another drop-down list 746. The user selected a double click 744 of the second finger to invoke the open function. The user then presses save button 748 to save the entries in the user file. In response, the main menu 600 shown in FIG. 6 appears. However, one skilled in the art readily recognizes that other changes in finger behavior and fingerprint area functionality may be made without departing from the scope and spirit of this preferred embodiment.

Returning to FIG. 6, if the user selects define pointer button 630, a "define pointer" menu appears that allows the user to define/redefine the shape, sensitivity, and position of the pointer on the virtual pointing device. Referring to define pointer menu 760 in FIG. 7, the user has a number of choices regarding the pointer. For example, the user can select a small, medium or large arrow, and/or a blinking arrow. The user can also select small or large pointer sensitivity, and the position of the pointer with respect to the virtual pointing device. For example, the pointer may be positioned over the third finger (default position), over the first finger, or below the palm. However, one skilled in the art readily recognizes that numerous changes in pointer behavior may be made without departing from the scope and spirit of this preferred embodiment. The user presses save button 762 to save the entries and, in response, the main menu 600 appears.

Finally, in FIG. 6, the user has the option of saving and exiting by pressing save/exit button 635, or cancelling all changes and returning to the default virtual pointing device by pressing cancel button 615.

Figure 4:
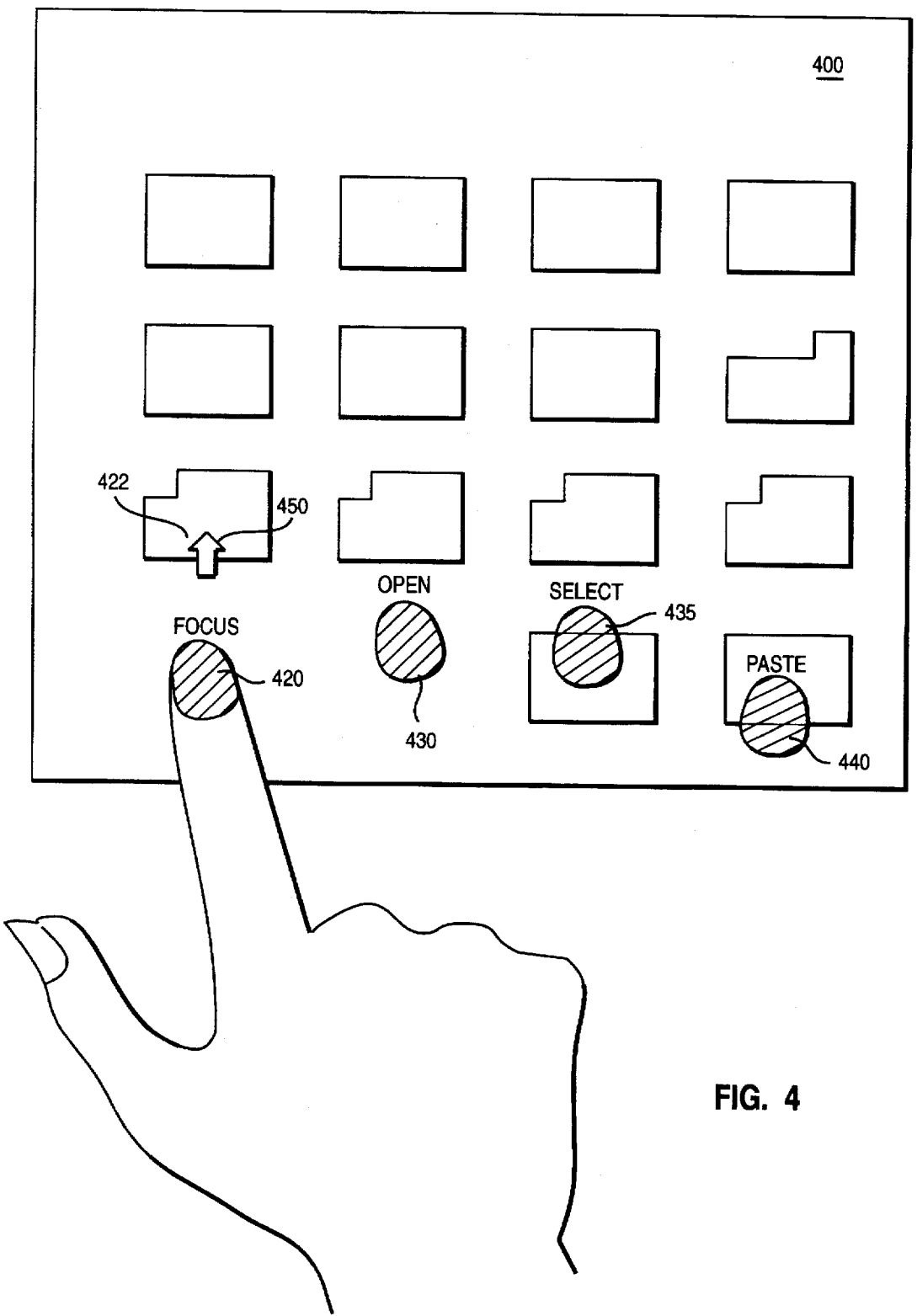
FIG. 4 illustrates a variation of the virtual pointing device illustrated in FIG. 2.

Referring to FIG. 4, in a second embodiment, the OS displays pre-determined, standard size fingerprint areas 415, 420, 430, 435 and 440 and pointer 450 as a non-activated (also referred to as "obvious hibernated") virtual pointing device. The fingerprint areas are displayed in a translucent state such that object icons can be seen through them. To activate the virtual pointing device, the user places one or more fingers over a fingerprint area 415, 420, 430, 435 or 440 on touchscreen 400. When the OS detects a sound pattern (or heat, pressure, etc.) over one or more of the fingerprints areas 420, 430, 435 and 440, the OS activates the virtual pointing device, thereby assigning a default function to each fingerprint area having a finger placed over it. Therefore, the fingerprint areas not having a finger placed over them will not be activated and, as such, will not have the default function assigned to them until they are activated. Each fingerprint area may be activated at any time.

As the user slides his/her fingers over touchscreen 400, the OS detects the touchscreen pixel coordinates under the user's moving fingers and, in response, continuously re-defines the "activated" areas of the virtual pointing device to be the touchscreen areas under the fingers. Therefore, the virtual pointing device moves with and according to the movement of the user's fingers.

The OS positions pointer 450 near the fingerprint area 420 such that pointer 450 moves in accordance with movement of the virtual pointing device. Therefore, the user could, for example, move the virtual pointing device such that pointer 450 is positioned over a desired object icon. Alternatively, the user could merely lift his hand and place it at a desired location, whereby the OS would re-create the virtual pointing device under the user's fingers at the new location.

In this example, the user has placed his/her first finger over fingerprint area 420 to activate the virtual pointing device. If the user desires to resize the distance between the fingerprint areas of the virtual pointing device, the user merely places a separate finger, one by one, over each displayed fingerprint area (thereby activating them) and then slides each finger outward or inward, as appropriate, to customize the shape of the virtual pointing device. In this manner, the user customizes the size of the virtual pointing device to the size of his/her fingers. In this way, the user may actively customize the size of the virtual pointing device each time he/she uses it.

Once the user positions pointer 450 over a desired object icon 422, the user could, for example, single click his first finger over fingerprint area 420 to transfer focus to object icon 422. However, only generic functions (or previously established functions) can be used for this embodiment.

While the invention has been shown and described with reference to a particular embodiment thereof, it will be understood by those skilled in the art that the foregoing and other changes in form and detail may be made therein without departing from the spirit and scope of the invention, only defined by the appended claims.

What is claimed is:

1. A method for directing a computer system, having at least a processor, memory, and touchscreen for displaying object icons and text, to create a virtual pointing device on the touchscreen, comprising the steps of:
   measuring at least a first portion of a hand placed on the touchscreen;
   determining if at least one measurement of the first portion substantially matches any existing measurements stored in the memory;
   if a substantial match exists, reading the memory for pre-defined characteristics; and
   building a movable virtual pointing device on the touchscreen in accordance with the pre-defined characteristics such that said displayed object icons and text may be selected utilizing said movable virtual pointing device.

2. The method according to claim 1 further comprising the step of:
   if a substantial match does not exist, building the virtual pointing device on the touchscreen in accordance with generic characteristics.

3. The method according to claim 1 wherein the measuring step comprises the steps of:
   measuring a distance between a thumbprint area of the touchscreen under the thumb of the hand and a palmprint area of the touchscreen under the hand; and
   measuring a area of the touchscreen under the palmprint.

4. The method according to claim 1 wherein the measuring step comprises the step of:
   measuring a distance between one or more fingerprint areas of the touchscreen under a finger and a palmprint area of the touchscreen under the palm.

5. The method according to claim 1 wherein the measuring step comprises the step of:
   measuring an area of one or more fingerprint areas under one or more fingers.

6. The method according to claim 1 wherein the determining step comprising the step of:
   determining if the measurements of the first portion match any existing measurements stored in a database within a percentage tolerance.

7. The method according to claim 1 wherein the step of reading the memory for pre-defined characteristics comprises the step of:
   searching the memory for size, functionality and pointer sensitivity data.

8. The method according to claim 1 wherein the building step comprises the following step:
   activating at least one area on the touchscreen having a size and functionality in accordance with the pre-defined characteristics.

9. The method according to claim 8 further comprising the step of:
   activating the area on the touchscreen under at least a second portion of the hand, such that the activated area moves in accordance with movement of the second portion of the hand along the touchscreen.

10. A computer system, having at least a processor, memory, and touchscreen for displaying object icons and text, for creating a virtual pointing device, comprising:
    means for measuring at least a first portion of a hand placed on the touchscreen;
    means for determining if at least one measurement of the first portion substantially matches any existing measurements stored in the memory;
    if a substantial match exists, means for reading the memory for pre-defined characteristics; and
    means for building a movable virtual pointing device on the touchscreen in accordance with the pre-defined characteristics such that said displayed object icons and text may be selected utilizing said movable virtual pointing device.

11. The computer system according to claim 10 further comprising:
    if a substantial match does not exist, means for building the virtual pointing device on the touchscreen in accordance with generic characteristics.

12. The computer system according to claim 10 wherein the measuring means comprises:
    means for measuring a distance between a thumbprint area of the touchscreen under the thumb of the hand and a palmprint area of the touchscreen under the hand; and
    means for measuring a area of the touchscreen under the palmprint.

13. The computer system according to claim 10 wherein the measuring means comprises:
    means for measuring a distance between one or more fingerprint areas of the touchscreen under a finger and a palmprint area of the touchscreen under the palm.

14. The computer system according to claim 10 wherein the measuring means comprises:

means for measuring an area of one or more fingerprint areas under one or more fingers.

15. The computer system according to claim 10 wherein the determining means comprises:

means for determining if the measurements of the first portion match any existing measurements stored in a database within a percentage tolerance.

16. The computer system according to claim 10 wherein the means for reading the memory for pre-defined characteristics comprises:

means for searching the memory for size, functionality and pointer sensitivity data.

17. The computer system according to claim 10 wherein the building means comprises:

means for activating at least one area on the touchscreen having a size and functionality in accordance with the pre-defined characteristics.

18. The computer system according to claim 10 further comprising:

means for activating the area on the touchscreen under at least a second portion of the hand, such that the activated area moves in accordance with movement of the second portion of the hand along the touchscreen.

19. An article of manufacture comprising:

computer readable program code means for causing a computer system, having at least a processor, memory, and touchscreen for displaying object icons and text, to create a virtual pointing device, the computer readable program code means in the article of manufacture comprising:

computer readable program code means for causing the computer system to measure at least a first portion of a hand placed on the touchscreen;

computer readable program code means for causing the computer system to determine if at least one measurement of the first portion substantially matches any existing measurements stored in the memory;

if a substantial match exists, computer readable program code means for causing the computer system to read the memory for pre-defined characteristics; and computer readable program code means for causing the computer system to build a movable virtual pointing device on the touchscreen in accordance with the pre-defined characteristics such that said displayed object icons and text may be selected utilizing said movable virtual pointing device.

* * * * *